Feb. 13, 1934.    F. H. OWENS    1,946,587

RECORDING AND REPRODUCING LAMP FOR PHOTOGRAPHIC SOUND RECORDS

Filed Sept. 16, 1929

INVENTOR.
FREEMAN H. OWENS.

BY
ATTORNEY.

Patented Feb. 13, 1934

1,946,587

UNITED STATES PATENT OFFICE 1,946,587

RECORDING AND REPRODUCING LAMP FOR PHOTOGRAPHIC SOUND RECORDS

Freeman H. Owens, New York, N. Y.

Application September 16, 1929
Serial No. 393,031

1 Claim. (Cl. 176—16)

My invention relates to a recording and reproducing lamp for photographic sound records and has for its primary object, provision of a lamp within the glass tube of which is located the slit member through which light from the lamp may pass to the traveling film.

More specifically my invention relates to a lamp within the glass bulb or tube of which there is positioned a plate in front of the lamp filament provided with a slit preferably in alignment therewith producing a narrow beam of light through such slit which may be utilized either to record or reproduce photographic sound records.

In the art of sound photography, it has been the custom to provide a narrow slit between the light source and the traveling film, through which the light passes to the film. In practice it has been found that the proper adjustment of this slit both as to its angular relation to the film and to its position with respect to the lamp filament and the film as well as the focus of the illuminated aerial image thereof, offer many difficulties in securing the accuracy required for the operations of recording or reproducing sound photographically. I have provided a novel form of lamp with a slit mounted therein, whereby adjustment of the lamp with respect to the film takes care of the adjustment of the slit and thereby simplifies greatly the assembly and operation of the sound recording and reproducing apparatus of this character.

Other objects and advantages in details of construction and operation will be apparent as the description proceeds, reference now being had to the figures of the accompanying drawing forming a part of this application and wherein like reference numerals indicate like parts.

In the drawing:—

Figure 1:
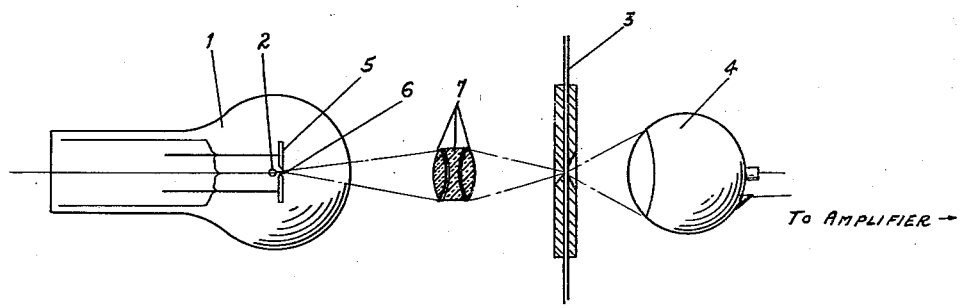
Figure 1 is a partially diagrammatic and partially sectional side view of my invention.
Figures 2, 3:
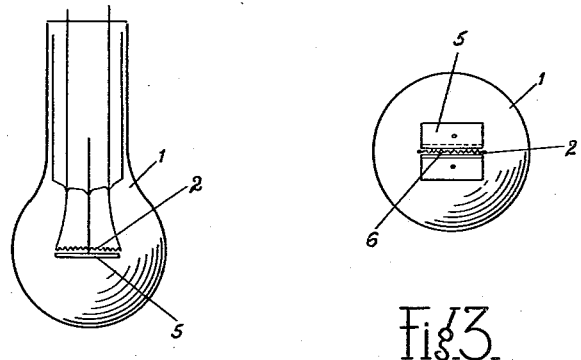
Figure 2 is a detailed plan view of my improved lamp.
Figure 3 is a detailed end view of my improved lamp.

I have shown as illustrative of my invention, a sound reproducing lamp in connection with the other elements essential to the reproduction of a photographic sound record. It will be understood that my invention is equally adaptable for use with a recording lamp.

Reference character 1 refers to a lamp adapted to receive a current of electricity from any suitable source (not shown) serving to illuminate the filament 2 causing it to glow brightly. A strip of film 3 may be moved at a constant speed past in alignment with the lamp by any suitable film moving mechanism also not shown.

A photoelectric cell 4 is positioned to receive the modulated light rays passing through a sound record carried by the film 3, the output of the photoelectric cell having suitable connection to an amplifier and loud speaker for rendering the translated sound audible in the usual manner.

Suitably mounted and supported within the glass housing of the lamp is a plate 5 provided with a narrow slit 6 preferably directly adjacent to and in alignment with the filament 2 of the lamp. The light from such filament therefore illuminates the slit 6, the illuminated aerial image of which may be focused by lens 7 upon the sound record of the film 3.

Inasmuch as the slit 6 is very narrow usually 1/1000 of an inch or less in width, it is always certain to be illuminated by the filament 2 even though the filament may through usage, become sagged or distorted inasmuch as the filament is considerably larger in diameter than the slit is wide. This is an important feature and advantage of this construction.

Obviously with the slit 6 located within the lamp 1 and directly adjacent the filament thereof, it is necessary only to adjust the position of the lamp with respect to the lens 7 and the sound record on the film 3 in order that a sharply focused illuminated image of the slit will strike the sound track on the film. This greatly simplifies both the assembly of the sound reproducing apparatus and the adjustment thereof during use.

Of course, many changes may be made in details of construction and arrangement of parts without departing from the spirit and scope of my invention. I do not limit myself therefore to the exact form shown and described other than by the appended claim.

I claim:—

A lamp for photographic sound recording and reproducing comprising a tube, a filament therein, and means wholly in said tube forming a narrow effective recording and producing slit therein through which light from said filament passes, said slit and filament being in alignment with each other, and said filament being of greater diameter than the width of said slit.

FREEMAN H. OWENS.

CERTIFICATE OF CORRECTION.

Patent No. 1,946,587.  February 13, 1934.

FREEMAN H. OWENS.

It is hereby certified that error appears in the printed specification of the above numbered patent requiring correction as follows: Line 101, the claim, for "producing" read reproducing; and that the said Letters Patent should be read with this correction therein that the same may conform to the record of the case in the Patent Office.

Signed and sealed this 13th day of March, A. D. 1934.

F. M. Hopkins (Seal) Acting Commissioner of Patents.